United States Patent
Hsu et al.

(10) Patent No.: US 9,706,130 B2
(45) Date of Patent: Jul. 11, 2017

(54) CAMERA HAVING HDR DURING PRE-FLASH

(71) Applicant: BlackBerry Limited, Waterloo (CA)

(72) Inventors: Cheng-Sheng Hsu, Waterloo (CA); Martin Frank Clayton Van Hoeckel, Woodstock (CA); Joey Shah, Cambridge (CA); Sung Ho Hong, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/723,900

(22) Filed: May 28, 2015

(65) Prior Publication Data

US 2016/0352994 A1    Dec. 1, 2016

(51) Int. Cl.
*H04N 5/235* (2006.01)
*H04N 5/225* (2006.01)

(52) U.S. Cl.
CPC ......... *H04N 5/2355* (2013.01); *H04N 5/2256* (2013.01); *H04N 5/2351* (2013.01); *H04N 5/2354* (2013.01)

(58) Field of Classification Search
CPC .... H04N 5/2355; H04N 5/2256; H04N 5/355; H04N 5/2354; H04N 5/2353; H04N 5/2351; H04N 5/2352
See application file for complete search history.

(56) References Cited

U.S. PATENT DOCUMENTS

| 6,744,471 B1* | 6/2004 | Fukuda et al. ......... H04N 5/235 348/216.1 |
| 7,098,946 B1* | 8/2006 | Koseki et al. ..... H04N 5/23293 348/229.1 |
| 2015/0130967 A1 | 5/2015 | Pieper |

OTHER PUBLICATIONS

EPO, Extended European Search Report relating to EP application No. 16169731.3, dated Sep. 28, 2016.

* cited by examiner

*Primary Examiner* — Twyler Haskins
*Assistant Examiner* — Akshay Trehan
(74) *Attorney, Agent, or Firm* — Rowand LLP

(57) ABSTRACT

An electronic device is described. The electronic device includes a flash configured to generate a pre-flash and a regular flash and a camera. The electronic device also includes a processor communicatively coupled to the flash and the camera. The processor is configured to, in response to receiving a picture request: determine one or more high dynamic range (HDR) settings and configure an HDR mode of the camera with the determined HDR settings; cause the flash to generate a pre-flash while the HDR mode of the camera is configured with the determined HDR settings; obtain an HDR image from the camera after causing the flash to generate the pre-flash and while the camera is configured with the determined HDR setting; and determine one or more camera configuration settings based on the obtained HDR image.

12 Claims, 4 Drawing Sheets

CAMERA HAVING HDR DURING PRE-FLASH

TECHNICAL FIELD

The present disclosure relates to electronic devices having cameras and, more particularly, to methods and devices for automatically configuring settings for use when acquiring an image with a camera.

BACKGROUND

Electronic devices having cameras are often equipped with a flash that may trigger a pre-flash. A pre-flash is a light pulse fired before a regular flash is generated and an image captured. The pre-flash may be used to reduce a red-eye effect in the captured image or to estimate the proper flash power and exposure settings to ensure the captured image is properly exposed. More specifically, the pre-flash may be triggered and pre-flash data obtained, possibly in the form of a temporary image. Using the pre-flash data, various settings may be determined that are to be used for the camera when obtaining the captured image. For example, a focus point may be determined, a white balance value may be set and/or an exposure to be used to obtain the captured image may be set.

The pre-flash is typically designed to be brief in duration in order to minimize power consumption and also to enrich the user experience. Typically, when pre-flash is used to acquire a single temporary image which is used to determine the camera settings, far objects will appear under-exposed and close objects will appear over-exposed. This can make it difficult to estimate the camera settings, such as the exposure settings.

BRIEF DESCRIPTION OF THE DRAWINGS

Reference will now be made, by way of example, to the accompanying drawings which show an embodiment of the present application, and in which.

Like reference numerals are used in the drawings to denote like elements and features.

DETAILED DESCRIPTION OF EXAMPLE EMBODIMENTS

Figure 2:
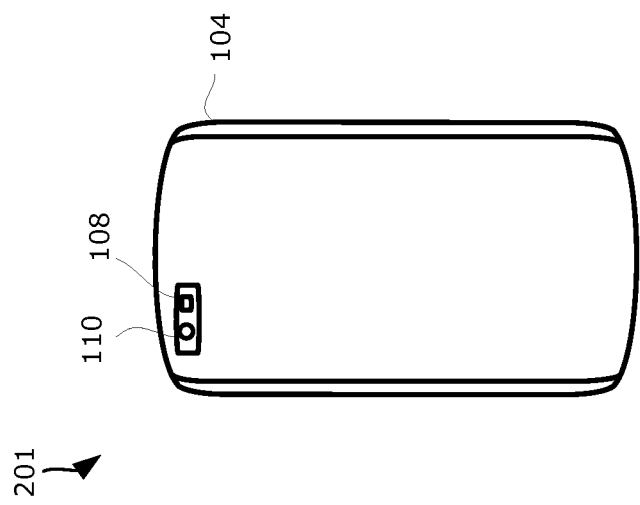
FIG. 2 is a rear view of the example electronic device of FIG. 1.

In one example aspect, the present application describes an electronic device. The electronic device includes a flash configured to generate a pre-flash and a regular flash and a camera. The electronic device also includes a processor communicatively coupled to the flash and the camera. The processor is configured to, in response to receiving a picture request: determine one or more high dynamic range (HDR) settings and configure an HDR mode of the camera with the determined HDR settings; cause the flash to generate a pre-flash while the HDR mode of the camera is configured with the determined HDR settings; obtain an HDR image from the camera after causing the flash to generate the pre-flash and while the camera is configured with the determined HDR setting; and determine one or more camera configuration settings based on the obtained HDR image.

In yet another embodiment, a processor-implemented method is described. The method includes, in response to receiving a picture request: determining one or more high dynamic range (HDR) settings and configure an HDR mode of a camera with the determined HDR settings; causing a flash to generate a pre-flash while the HDR mode of the camera is configured with the determined HDR settings; obtaining an HDR image from the camera after causing the flash to generate the pre-flash and while the camera is configured with the determined HDR settings; and determining one or more camera configuration settings based on the obtained HDR image.

In yet a further embodiment, a non-transitory computer-readable storage medium comprising processor-executable instructions is described. The instructions include: instructions for determining one or more high dynamic range (HDR) settings and configure an HDR mode of a camera with the determined HDR settings; instructions for causing a flash to generate a pre-flash while the HDR mode of the camera is configured with the determined HDR settings; instructions for obtaining an HDR image from the camera after causing the flash to generate the pre-flash and while the camera is configured with the determined HDR setting; and instructions for determining one or more camera configuration settings based on the obtained HDR image.

In yet a further aspect, the present application describes non-transitory computer-readable media storing computer-executable program instructions which, when executed, configured a processor to perform the described methods.

Other aspects and features of the present application will be understood by those of ordinary skill in the art from a review of the following description of examples in conjunction with the accompanying figures.

In the present application, the term "and/or" is intended to cover all possible combination and sub-combinations of the listed elements, including any one of the listed elements alone, any sub-combination, or all of the elements, and without necessarily excluding additional elements.

In the present application, the term "a processor" is intended to include both a single processor and also a plurality of processors coupled to one another which distribute operations among the processors.

Figure 1:
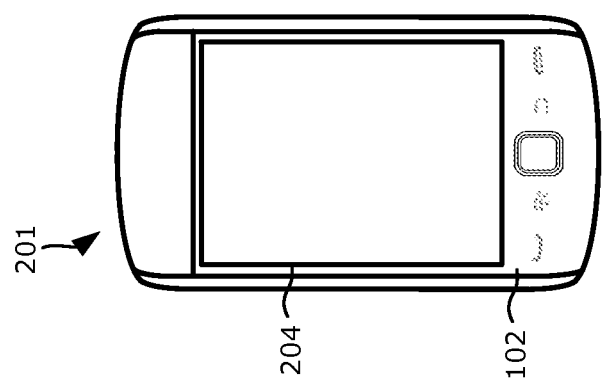
FIG. 1 is a front view of an example electronic device in accordance with example embodiments of the present disclosure.

Reference will now be made to FIGS. 1 and 2, which illustrate an example electronic device having a camera. The electronic device 201 that is equipped with the camera may take a variety of forms. In the illustrated example, the electronic device is a smartphone. However, in other embodiments, the electronic device 201 could be a tablet computer, a stand-alone camera (i.e., a digital camera), a PDA, a wearable computer such as a watch, or an electronic device of another type.

FIG. 1 illustrates a front side 102 of the electronic device 201 and FIG. 2 illustrates a rear side 104 of the electronic device 201. The example electronic device 201 includes a housing which houses at least some of the components of the electronic device 201. At least some of these components will be described below with reference to FIG. 3.

In the example embodiment illustrated, the electronic device 201 includes a display 204, which may be a touchscreen display which acts as both an input interface and an output interface. The display 204 is disposed within the electronic device 201 so that it is viewable at a front side 102 of the electronic device 201.

In an operating mode, the display 204 acts as a viewfinder for a camera, displaying, in real time or near real time, images defined in electronic signals received from a camera. The viewfinder allows a user to preview an image.

Referring now to FIG. 2, a rear side 104 of the electronic device 201 is shown. The example electronic device includes a camera 108 which is, in the example, provided on a rear side 104 of the electronic device 201. In this configuration, the camera 108 may be referred to as a rear-facing camera.

The methods and system described herein can be used with both front facing cameras and rear facing cameras. Thus, while the example embodiment includes a single camera 108, which is rear-facing, the electronic device 201 may, in other embodiment, include one or more front facing cameras instead of, or in addition to, the rear facing camera. A front facing camera is one that is located on the front side 102 (FIG. 1) of the electronic device 201 and is oriented to capture images of subjects which are located in front of and/or surrounding the front side 102 of the electronic device 201.

The electronic device 201 includes a flash 110 which is associated with the camera 108. The flash 110 may be one or more light emitting diode (LED), a tube substantially filled with xenon gas, or any other flash device. The flash 110 emits electromagnetic radiation when the flash 110 is triggered. More particularly, the flash 110 may be used to generate a brief bright light which facilitates picture-taking in low light conditions.

The flash 110 is configured to generate at least two types of flashes—a pre-flash and a regular flash. The pre-flash is a flash which that is generated prior to the regular flash.

One or more input interface is provided on the electronic device 201 to allow a user to input a picture request. The picture request is a command instructing the electronic device 201 to acquire an image with a camera 108 associated with the electronic device. The input interface may be, for example, a physical or virtual button or key. A user may also use an input interface, in some embodiments, to set settings that will be used when acquiring the image. For example, an input interface may allow a user to set a flash mode for the electronic device 201. The flash mode may be set to a "flash off" mode in which the flash is not triggered before acquiring an image, a "flash on" mode in which the flash is triggered before acquiring an image, or an "auto flash" mode in which the electronic device 201 automatically determines whether to trigger the flash. When the auto flash mode is selected, the electronic device 201 may determine whether low-light conditions exist and, if so, may enable the flash.

Figure 3:
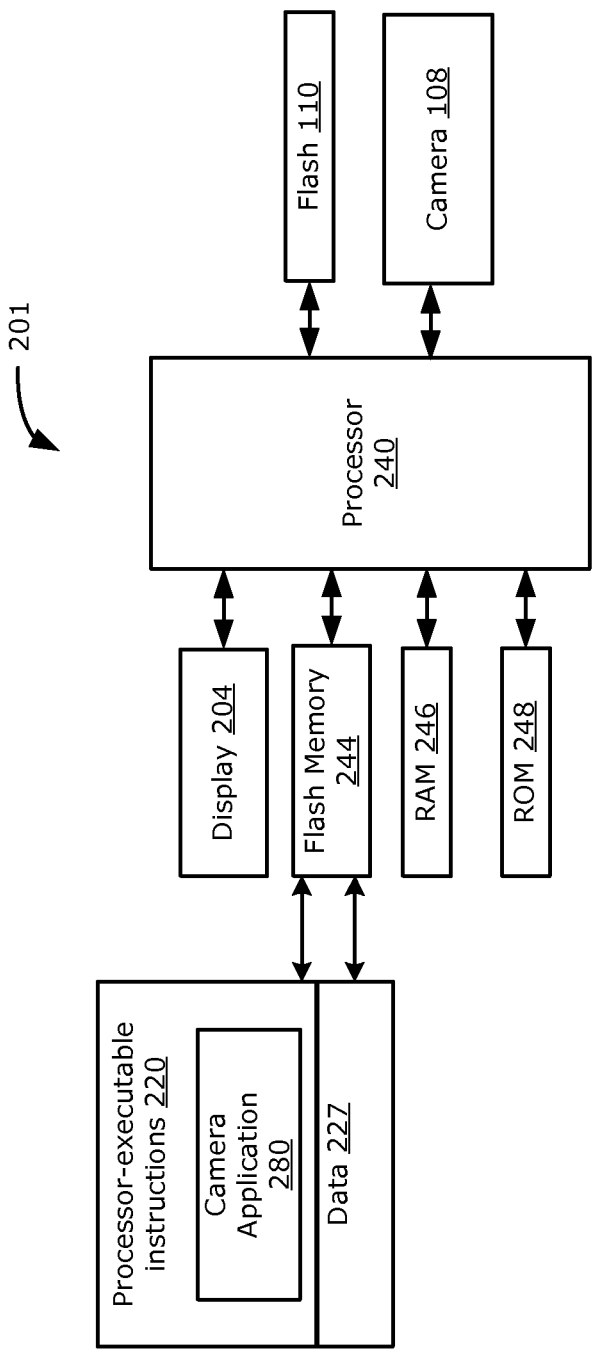
FIG. 3 is a block diagram illustrating an example electronic device in accordance with example embodiments of the present disclosure.

Reference is now made to FIG. 3 which illustrates a block diagram of components of the example electronic device 201.

The electronic device 201 includes a controller including at least one processor 240 (such as a microprocessor) which controls the overall operation of the electronic device 201. The processor 240 in communicatively coupled with device subsystems such as one or more output interfaces (such as a display 204, a flash 110 and/or a speaker), one or more input interfaces (such as the camera 108, control buttons (not shown), a touch-sensitive overlay (not shown) associated with a touchscreen display and/or other input interfaces), memory (such as flash memory 244, random access memory (RAM) 246, read only memory (ROM) 248, etc.).

The electronic device 201 includes a camera 108 capable of capturing camera data, such as images, in the form of still photo and/or motion data. The camera data may be generated in the form of an electronic signal which is produced by an image sensor associated with the camera 108.

The electronic device 201 stores data 227 in an erasable persistent memory, which in one example embodiment is the flash memory 244. In various example embodiments, the data 227 includes images generated by the camera 108.

The processor 240 operates under stored program control and executes processor-executable instructions 220 stored in memory such as persistent memory; for example, in the flash memory 244.

The processor-executable instructions 220 or parts thereof may be temporarily loaded into volatile memory such as the RAM 246. The RAM 246 is used for storing runtime data variables and other types of data or information, as will be apparent. Although specific functions are described for various types of memory, this is merely one example, and it will be appreciated that a different assignment of functions to types of memory could also be used.

The processor 240 may be communicatively coupled to the camera 108 to allow the processor 240 to receive electronic signals representing camera data from the camera 108. The processor 240 may also be communicatively coupled to the flash 110 to allow the processor 240 to control the flash.

In at least some embodiments, the processor-executable instructions may include one or more camera applications 280 or software modules which are configured to control the camera 108 and the flash 110. The camera application 280 may, for example, be configured to provide a viewfinder on the display 204 by displaying, in real time or near real time, images defined in the electronic signals received from the camera 108. The camera application 280 may also be configured to capture images or videos by storing images or videos defined by the electronic signals received from the camera 108. For example, the camera application 280 may be configured to store the images or videos to memory; for example the flash memory 244. The images may be stored in various formats including JPEG, RAW, BMP, etc.

The camera application 280 may, in various embodiments, determine and/or control any one or more of a number of various camera related features, options or settings including, for example, the flash 110, a digital zoom feature (which may crop an image to a centered area with the same aspect ratio as the original), an image stabilization feature, a shutter speed, a camera lens aperture, a focal length, high dynamic range settings such as a long exposure time and a short exposure time, a white balance setting, and other camera configuration settings. At least some of the features may be automatically determined by the camera application 280. That is, at least some of these settings may be determined without direct user input setting such settings.

The camera 108 is configured to provide high dynamic range (HDR) imaging when operating in an HDR mode. HDR imaging provides a higher dynamic range of luminosity than is possible with traditional non-HDR imaging. The HDR camera uses multiple exposure settings in order to capture a first image. More particularly, multiple exposure times can be used to acquire a single HDR image.

Traditionally, HDR is achieved by capturing multiple images at different exposure times and then combining data from each of the images to obtain the HDR image. The images that are used to generate the HDR image are captured very close in time to one another in order to minimize changes in a scene that may have occurred. However, in one embodiment, the camera 108 includes an image sensor which has HDR capability in the pixels themselves. That is, the camera 108 may include a simultaneous dual exposure HDR sensor which is capable of acquiring an HDR image without having to take consecutive images. By eliminating the need for consecutive images, such image sensors are less susceptible to variations in the scene. For this reason, such sensors are useful when acquiring images along with a flash using the techniques described herein. Such simultaneous dual exposure HDR sensors are sometimes referred to as smart wide dynamic range (WDR) sensors or interlaced WDR sensors.

The camera 108 may, in some embodiments, generate the HDR image on-chip. That is, the camera 108 itself may output an HDR image when it is operating in an HDR mode. Such a camera 108 may provide both an HDR mode, which outputs an HDR image, and a non-HDR mode, which outputs a non-HDR image. In other embodiments, the camera 108 may output non-HDR data which may be combined at another location, such as the processor 240, in order to generate the HDR image.

When operating in the HDR mode, the camera 108 is configured with one or more HDR settings such as, for example, a long exposure time and a short exposure time. The HDR settings may also include a plurality of gain settings. Each of the gain setting may be associated with a different one of the exposure times. For example, a first gain setting may be associated with the long exposure time and a second gain setting may be associated with the short exposure time.

While the embodiment discussed above includes a processor 240 coupled with a camera application 280 which collectively act as an image signal processor to provide image related functions, in other example embodiments (not shown), another processor such as a dedicated image signal processor, may provide some or all of these functions. That is, an image signal processor may be configured to perform the functions of the camera application 280 or a portion thereof.

For example, the camera 108 may be a digital camera provided in an integrated circuit (IC) having a memory such as Electrically Erasable Programmable Read-Only Memory (EEPROM) or flash memory, analog-to-digital (A/D) converter and a controller such as a suitably programmed microprocessor or Field Programmable Gate Array (FPGA). The IC may provide an industry standard interface such as an SPI (Serial Peripheral Interface) or I2C (Inter-Integrated Circuit) interface for connecting to a printed circuit board (PCB) of the electronic device 201. The controller provided on the IC may be configured to perform some or all of the features of the methods described herein.

Furthermore, while the camera application 280 has been illustrated as a stand-alone application, in at least some example embodiments, the functions of the camera application 280 may be provided by a plurality of software modules. In at least some example embodiments, these software modules may be divided among multiple applications.

Furthermore, while the memory which stores the processor-executable instructions 220 has been illustrated using a block that is separate from the processor 240, in practice, the memory storing the processor-executable instructions may be provided on-board the processor 240. That is, the processor 240 includes internal memory and the processor-executable instructions are provided on the internal memory.

The electronic device 201 will include other components apart from those illustrated in FIG. 3. By way of example, the electronic device 201 will include or be connected to a power source, such as a battery, which provides power to various components of the electronic device.

Figure 4:
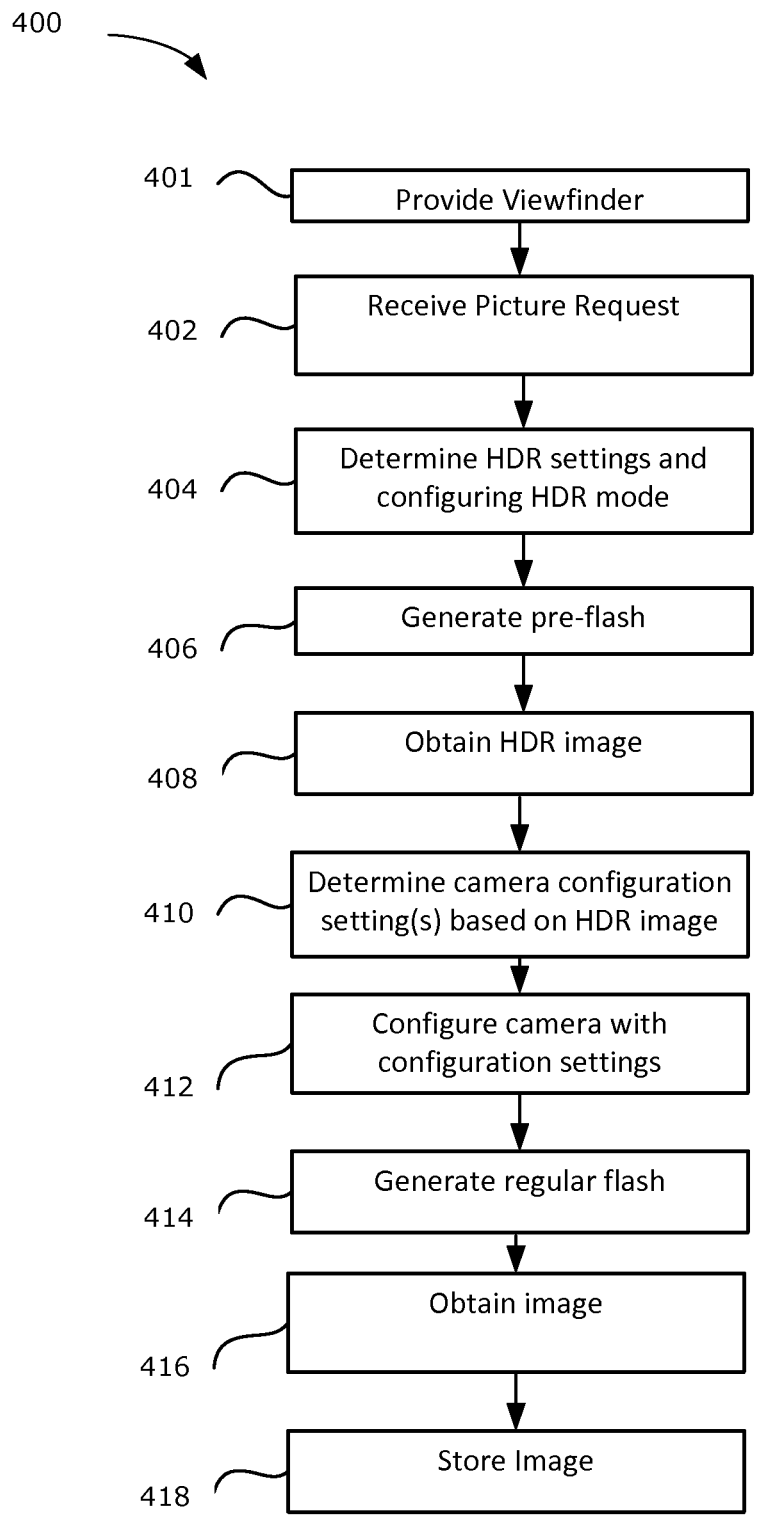
FIG. 4 is a flowchart illustrating an example method of calibrating a camera using HDR during a pre-flash.

Reference will now be made to FIG. 4 which illustrates an example method 400 for generating an image. The method 400 may be performed by an electronic device 201 of the type described above with reference to FIGS. 1 to 3 or a variation of such electronic devices. For example, in at least some embodiments, processor-executable instructions 220, such as a camera application 280, may configure a processor of the electronic device 201 to perform the method 400.

At operation 401, the electronic device 201 provides a viewfinder. The viewfinder is generated based on camera data obtained from a camera 108 associated with the electronic device 201 and appears on a display 204 as a real-time or near-real-time feed of the camera data. The viewfinder allows a user to preview an image that would be captured by the electronic device if the user were to provide a picture request to the electronic device 201. The camera data associated with the viewfinder may be temporarily stored in a cache in memory.

At operation 402, a picture request is received at the electronic device 201. The picture request is a request to capture a picture and is received via an input interface of the electronic device 201 such as, for example, a touchscreen display, a physical button, etc.

In response to receiving the picture request, the electronic device performs the other operations of the method 400 including, at operation 404, determining an HDR setting for an HDR mode of the camera 108 and enabling and configuring the HDR mode based on the determined HDR settings. The determined HDR settings may include a long exposure time and a short exposure time. The long exposure time and the short exposure time may be determined by analyzing camera data associated with the viewfinder. For example, camera data associated with the viewfinder may be retrieved from cache, analyzed, and the long exposure time and short exposure time determined. The camera data associated with the viewfinder may be referred to as preview images.

The long exposure time may be determined to expose dark portions of a scene represented by an image (such as a preview image) and, in at least some embodiments, the short exposure time may be determined based on a predetermined ratio of the long exposure time. For example, in one embodiment, the short exposure time may be set to be ½ the long exposure time. In another embodiment, the short exposure time may be set to be ¼ the long exposure time. In yet another embodiment, the short exposure time may be set to be ⅛ the long exposure time. Other ratios are also possible.

In other embodiments, instead of using a ratio in order to determine the short exposure time, the short exposure time may be independently determined based on scene content. For example, the short exposure time may be determined by identifying bright regions of the scene and determining the short exposure time based on the degree of brightness represented by such bright regions.

In some embodiment, the short exposure time could be determined first, based on the bright regions of the scene, and then the long exposure time could be set as a ratio of the short exposure time, or set dynamically.

Accordingly, the camera is configured to operate in the HDR mode and, once a long exposure time and a short exposure time are determined, the camera is configured to use these exposure times in the HDR mode.

In response to receiving the picture request, the electronic device 201 also, at operation 406, generates a pre-flash on the flash 110. The pre-flash is generated while the camera 108 is operating in the HDR mode and while the camera 108 is configured with the HDR settings determined at operation 404.

Also in response to receiving the picture request, at operation 408, the electronic device 201 obtains an HDR image from the camera 108. The HDR image is obtained immediately after the pre-flash is generated such that the pre-flash illuminates the scene captured by the HDR image. The HDR image is obtained while the camera remains configured with the HDR settings and while the HDR mode is enabled. The HDR image obtained at operation 408 may be referred to as a pre-flash image or pre-flash HDR image.

In response to receiving the picture request, at operation 410, the electronic device 201 determines one or more camera configuration settings based on the obtained HDR image. More particularly, the HDR image may be analyzed in order to determine one or more configuration settings that are to be used when generating the image that the user requested when issuing a picture request. In some embodiments, a white balance measurement may be determined based on the HDR image and one or more of the configuration settings determined based on the white balance measurement. The configuration settings that are determined at operation 410 may include any one or more of: exposure, gain, flash brightness, or other settings.

By capturing the pre-flash image while the camera 108 is operating in HDR mode, the electronic device significantly reduces the possibility of under or over exposing the pre-flash image. Thus, the calculation of at least some of the configuration settings may be more accurate and reliable than if the HDR mode was not used during the pre-flash.

At least some of the camera configuration settings are determined based on a single frame only i.e., the frame represented by the HDR image. That is, the camera configuration settings are determined without reference to a second frame represented by another image.

The HDR image obtained at operation 408 may be a temporary image which is automatically discarded after it is analyzed at operation 410. That is, the HDR image may not be committed to permanent memory but may, instead simply be used for analysis purposes to determine camera configuration settings to be used when generating a more permanent image.

In response to receiving the picture request at operation 402, at operation 412 the electronic device configures the camera 108 with one or more of the camera configuration settings determined at operation 410. That is, the camera is configured to use the determined settings when acquiring a further image.

In some embodiments, the electronic device 201 may have received input from a user of the electronic device indicating whether an image is to be captured in an HDR-mode. Such input may be received from an input interface of the electronic device 201 prior to or together with the picture request received at operation 402. In some embodiments, if the picture request was a request to capture a picture in a non-HDR mode (i.e. if the user specified that HDR is not to be used or if the user did not enable HDR), then the electronic device may disable the HDR mode of the camera 108 before the more permanent image is obtained (the more permanent image is obtained at operation 416, described below).

As will be explained below with reference to FIG. 5, in at least some embodiments, the HDR mode may remain enabled so that the more permanent image is obtained with the HDR mode enabled. In some such embodiments, one of the camera configuration settings determined at operation 410 may include a short range exposure time. The short range exposure time may be determined from the pre-flash image and the camera may be configured to use the short range exposure time when obtaining the more permanent image at operation 416.

In response to receiving the picture request at operation 402, the electronic device 201, at operation 414, causes the flash to generate a regular flash. The regular flash is longer in duration than the pre-flash.

At operation 416, in response to receiving the picture request at operation 402, the electronic device 201 obtains a further image from the camera. The image is obtained immediately after causing the flash to generate the regular flash such that the regular flash illuminates a scene represented by the obtained image. The image is obtained while the camera remains configured with one or more of the configuration settings determined at operation 412.

At operation 418, the image obtained at operation 416 is stored in memory of the electronic device 201.

The method 400 may include other operations instead of or in addition to some of the operations described above. For example, the method may include, prior to generating the pre-flash at operation 406, determining that a flash is to be used. For example, the picture request received at operation 402 is, in at least some embodiments, received together with or in association with one or more user-defined settings. Such settings may define a flash mode to be used by the electronic device 201. In at least some embodiments, before proceedings to operation 406, the electronic device 201 determines that a flash is to be used when acquiring an image.

While FIG. 4 illustrates an embodiment in which an HDR mode is used together with a pre-flash, in some embodiments, an HDR mode may be used with a regular flash. Referring now to FIG. 5, an example of one such method 500 is illustrated. The method 500 may be performed by an electronic device 201 of the type described above with reference to FIGS. 1 to 3 or a variation of such electronic devices. For example, in at least some embodiments, processor-executable instructions 220, such as a camera application 280, may configure a processor of the electronic device 201 to perform the method 500.

At operation 501, the electronic device 201 provides a viewfinder. The viewfinder may be provided in the manner described above with reference to operation 401 of the method 400 of FIG. 4.

At operation 502, a picture request is received at the electronic device 201. The picture request may be received in the manner described above with reference to operation 402 of the method 400 of FIG. 4.

Other operations 504, 506, 508, 510 of the method 500 may be performed in response to receiving the picture request. At operation 504, the electronic device 201 determines one or more HDR settings and enables the HDR mode of the camera 108, configuring the HDR mode with the HDR settings. For example, a long exposure time and a short exposure time may be determined. In at least some embodiments, the long exposure time is determined from a preview image associated with the viewfinder. That is, the preview image may be retrieved from cache and analyzed in order to determine the long exposure time. The short exposure time may, in some embodiments, be determined based on an image obtained when a pre-flash is triggered. In such embodiments, the method 500 includes an operation (not shown) in which the electronic device 201 causes the flash 110 to generate a pre-flash and obtains a temporary image that includes a scene illuminated by the pre-flash. This temporary image may be analysed to determine the short exposure time.

At operation 506, the flash 110 generates a regular flash.

At operation 508, the electronic device 201 obtains an HDR image from the camera 108 and, at operation 510, stores the obtained image in memory of the electronic device 201. The HDR image is obtained immediately after the regular flash is generated so that the regular flash illuminates the scene represented by the HDR image. The HDR image is obtained while the HDR mode of the camera is enabled and configured with the HDR settings determined at operation 408.

The methods 400, 500 may include an additional operation of determining that a flash should be used. The electronic device may determine that a flash should be used if user input is received via an input interface specifically instructing that the flash is to be used or, in some embodiments, if the electronic device has been configured to operate in an "auto" mode in which the electronic device itself determines whether the flash should be used by analyzing luminance information obtained from a light sensor or from an image obtained from the camera data. If the flash is not to be used, then the electronic device may not trigger either the pre-flash or the regular flash.

Figure 5:
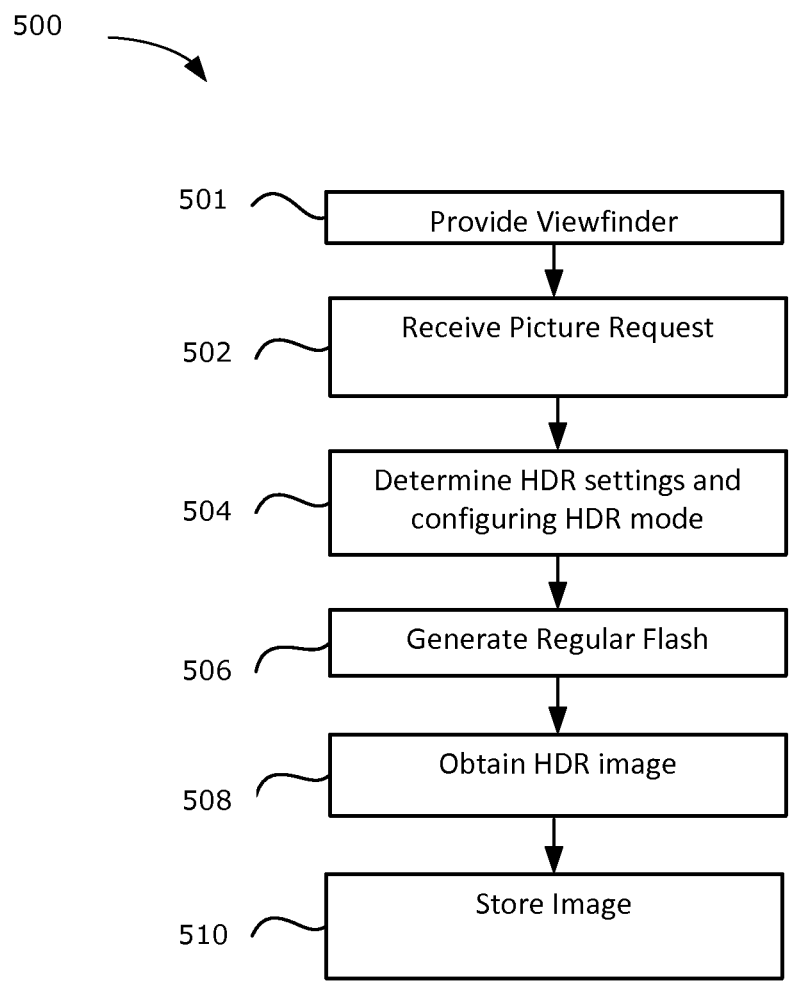
FIG. 5 is a flowchart illustrating an example method of obtaining an HDR image with a flash.

The techniques of the method 400 of FIG. 4 in which HDR is used with a pre-flash can, in some embodiments, be combined with the features of the method 500 of FIG. 5 in which HDR is used with a regular flash so that HDR is used with both a pre-flash and a regular flash.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. An electronic device comprising:
a flash configured to generate a pre-flash and a regular flash;
a camera;
a processor, communicatively coupled to the flash and the camera, the processor configured to, in response to receiving a picture request:
  determine one or more high dynamic range (HDR) settings and configure an HDR mode of the camera with the determined HDR settings;
  cause the flash to generate a pre-flash while the HDR mode of the camera is configured with the determined HDR settings;
  obtain an HDR image from the camera after causing the flash to generate the pre-flash and while the camera is configured with the determined HDR setting; and
  determine one or more camera configuration settings, wherein determining one or more camera configuration settings includes determining a short exposure time based on the obtained HDR image, and wherein determining one or more camera configuration settings further includes determining a long exposure time based on a preview image associated with a viewfinder;
  configure the camera based on the one or more configuration settings;
  cause the flash to generate a regular flash; and
  obtain an image from the camera after causing the flash to generate the regular flash and while the camera is configured to use the determined short exposure time and the determined long exposure time in the HDR mode.

2. The electronic device of claim 1, wherein the processor is further configured to:
automatically discard the HDR image after the one or more camera configuration settings are determined.

3. The electronic device of claim 1, wherein determining one or more camera configuration settings comprises:
determining a white balance measurement.

4. The electronic device of claim 1, wherein determining one or more HDR settings comprises:
determining a long exposure time and a short exposure time based on an image associated with a viewfinder.

5. The electronic device of claim 1, wherein the camera configuration settings are determined based on one frame only, the frame represented by the HDR image.

6. The electronic device of claim 1, wherein the camera includes a simultaneous dual exposure HDR image sensor.

7. A processor-implemented method comprising:
in response to receiving a picture request:
  determining one or more high dynamic range (HDR) settings and configure an HDR mode of a camera with the determined HDR settings;
  causing a flash to generate a pre-flash while the HDR mode of the camera is configured with the determined HDR settings;

obtaining an HDR image from the camera after causing the flash to generate the pre-flash and while the camera is configured with the determined HDR settings; and determining one or more camera configuration settings, wherein determining one or more camera configuration settings includes determining a short exposure time based on the obtained HDR image, and wherein determining one or more camera configuration settings further includes determining a long exposure time based on a preview image associated with a viewfinder;

configuring the camera based on the one or more configuration settings;

causing the flash to generate a regular flash; and obtaining an image from the camera after causing the flash to generate the regular flash and while the camera is configured to use the determined short exposure time and the determined long exposure time in the HDR mode.

8. The method of claim 7, further comprising:

automatically discarding the HDR image after the one or more camera configuration settings are determined.

9. The method of claim 7, wherein determining one or more camera configuration settings comprises:

determining a white balance measurement.

10. The method of claim 7, wherein determining one or more HDR settings comprises:

determining a long exposure time and a short exposure time based on an image associated with a viewfinder.

11. The method of claim 7, wherein the camera configuration settings are determined based on one frame only, the frame represented by the HDR image.

12. A non-transitory computer-readable storage medium comprising processor-executable instructions comprising:

instructions for determining one or more high dynamic range (HDR) settings and configure an HDR mode of a camera with the determined HDR settings;

instructions for causing a flash to generate a pre-flash while the HDR mode of the camera is configured with the determined HDR settings;

instructions for obtaining an HDR image from the camera after causing the flash to generate the pre-flash and while the camera is configured with the determined HDR setting; and instructions for determining one or more camera configuration settings, wherein determining one or more camera configuration settings includes determining a short exposure time based on the obtained HDR image, and wherein determining one or more configuration settings further includes determining a long exposure time based on a preview image associated with a viewfinder;

instructions for configuring the camera based on the one or more configuration settings;

instructions for causing the flash to generate a regular flash; and instructions for obtaining an image from the camera after causing the flash to generate the regular flash and while the camera is configured to use the determined short time and the determined long exposure time in the HDR mode.

* * * * *